Feb. 19, 1957 R. M. McLEAN, JR 2,781,615
WHEEL HOLD-DOWN DEVICE
Filed July 25, 1955 2 Sheets-Sheet 1

INVENTOR.
Ralph M. McLean, Jr.,
BY
Sabin C. Bronson.
Atty

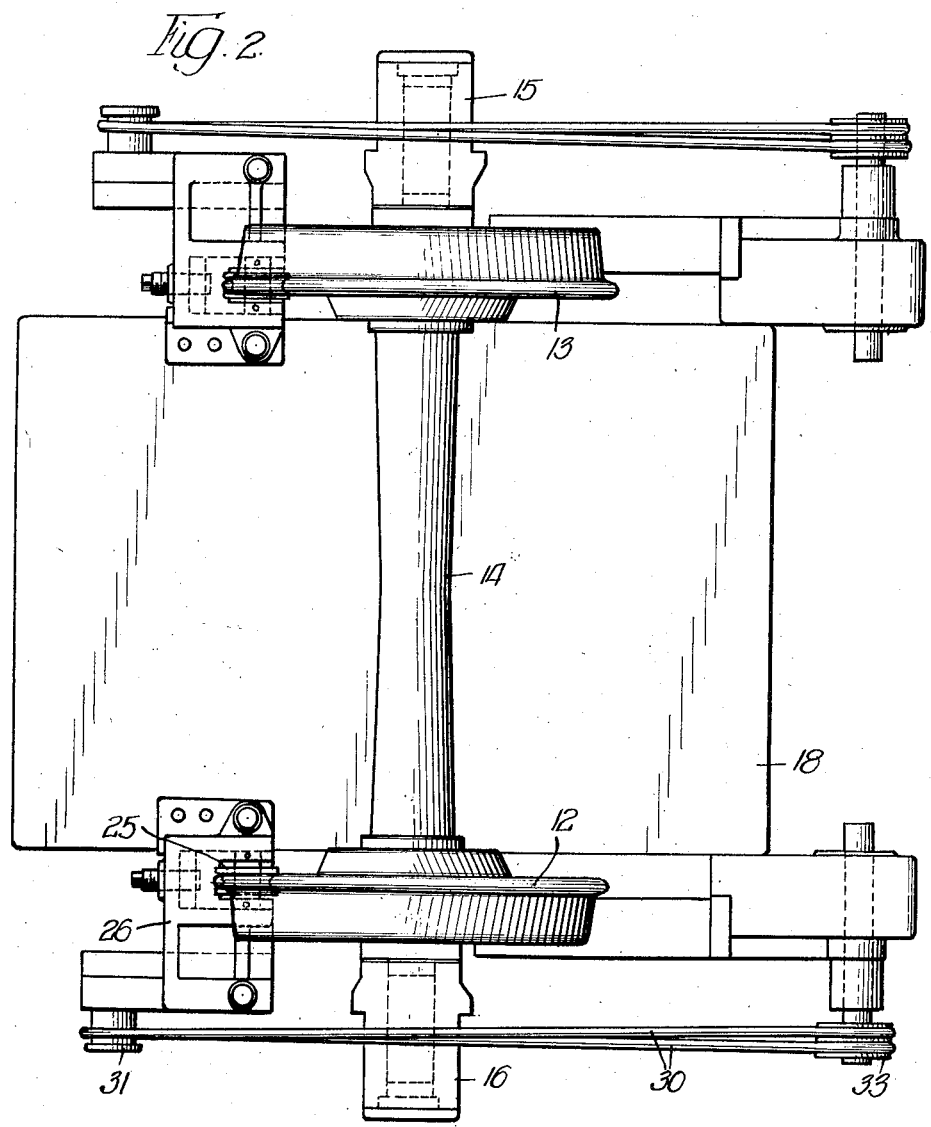

United States Patent Office

2,781,615
Patented Feb. 19, 1957

2,781,615
WHEEL HOLD-DOWN DEVICE

Ralph M. McLean, Jr., Skokie, Ill., assignor to Standard Railway Equipment Manufacturing Company, Chicago, Ill., a corporation of Delaware Application July 25, 1955, Serial No. 524,152

5 Claims. (Cl. 51—104)

This invention relates to wheel truing machines for truing railway car wheels which may be deformed from their original rotund shape as a result of uneven surface wear.

Such a machine is illustrated in the patent to Stanley, No. 2,622,374, dated December 23, 1952, which is designed especially for truing wheels of diesel locomotives by installing the machine in a pit under the rails, and running the locomotive over the pit and onto the machine so that a selected pair of wheels may be trued without removal from the locomotive. The machine of this patent is dependent upon the weight of the locomotive to hold the wheels to be trued against the cutters of the machine during the truing operation. If the pair of wheels to be trued is in a passenger or a freight car, there would not be sufficient weight in either of such cars to properly hold said wheels against the cutters, and this would be especially true with a pair of wheels on an axle disassembled from the car truck frame.

It is the principal object of this invention to provide a wheel truing machine such as shown in the Stanley patent with a hold-down device whereby a single pair of wheels mounted on an axle may be trued on said machine.

It is a further object of the invention to provide such a hold-down device adapted for holding a pair of wheels mounted in a truck frame alone or with a car supported thereon on the machine while being trued.

Further objects and advantages of this invention will become evident as the description proceeds and from an examination of the accompanying drawing which illustrates the embodiment of the invention and in which similar numerals refer to similar parts throughout the several views.

In the drawings:

Figure 2 is a top plan view of Figure 1.

Figure 1:
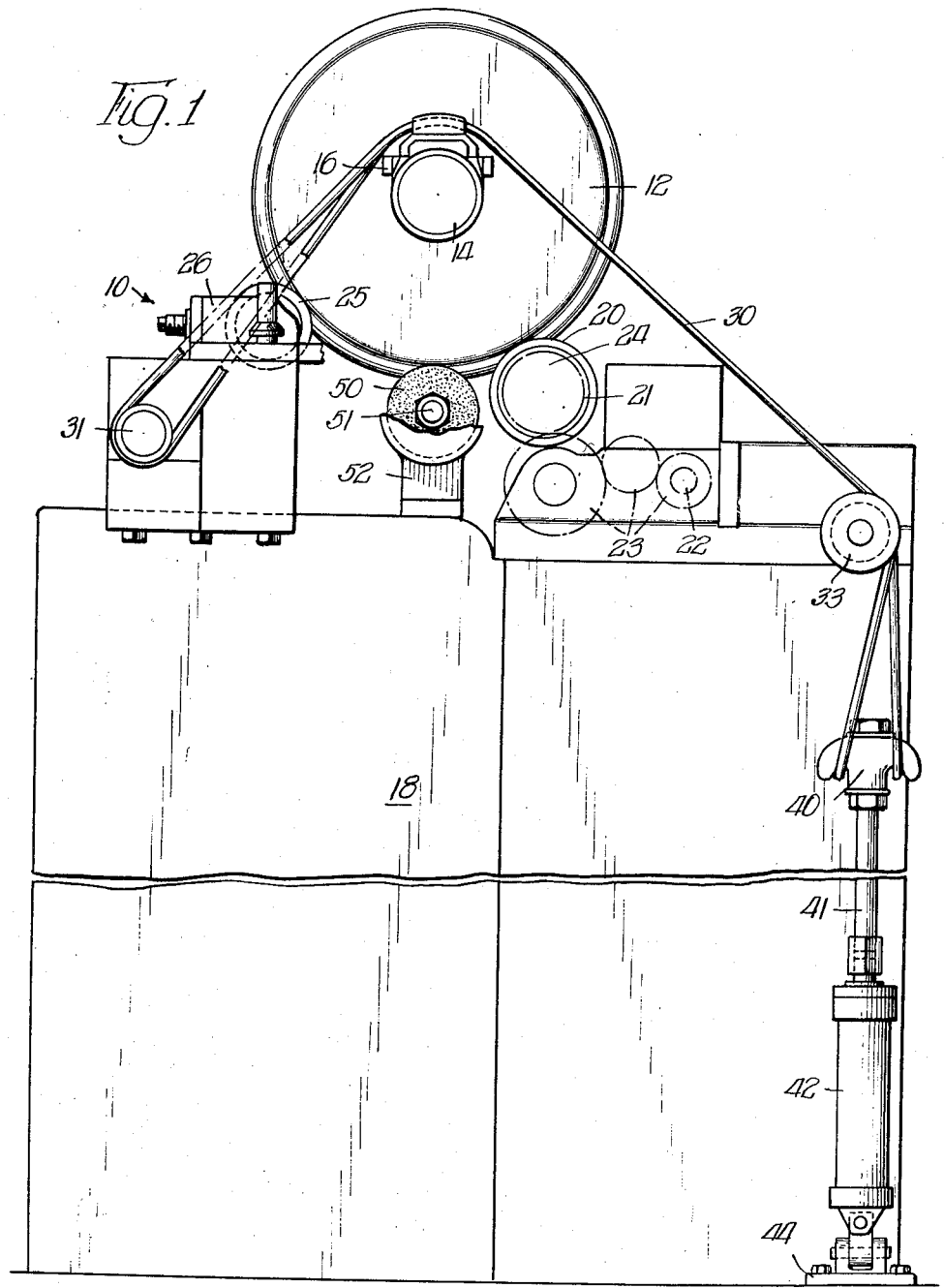
Figure 1 is a side elevation of the hold-down device showing in outline the associated parts of the wheel truing machine.

Referring now to the drawings, there is shown in Figure 1 a wheel truing device embodying the invention. Such a machine may be used for truing a single pair of wheels 12, 13 mounted on a vehicle axle 14. At the ends of the axle are a pair of bearings 15, 16.

In the truing machine of the invention there is provided a supporting frame 18 on which is mounted a cradle for supporting each of the vehicle wheels. The cradle for each wheel includes a driven roller 20 and an idler roller 25. The rollers are mounted to the side of the vertical radius of the vehicle wheel.

The driven roller 20 is mounted on the ends of a rotatable shaft 24 under each vehicle wheel. Mounted on the shaft is a gear 21 driven by drive shaft 22 through a gear train 23. The idler roller 25 may be mounted on an adjustable housing 26 which is slidable toward and away from the vehicle wheel. The adjustability of housing 26 is to accommodate varying diameters of wheels, and maintaining the surface of the wheels to be cut in the proper location relative to the cutter, and the wheel axle centers in proper position relative to the machine centers.

A hold-down device is provided in the truing machine of the invention comprising a flexible cable 30 of two strands, which is secured to post 31 and passed over the bearing 16 and thence over a double pulley 33 to a hook 40.

Hook 40 is connected to piston 41 of an hydraulic cylinder 42. The cylinder is anchored to the floor by bracket 44. By moving the piston by a suitable hydraulic supply, the cable may be tightened or loosened, while permitting rotation of the wheels as held.

A cutting arbor 50 is mounted in line with vertical radius of the vehicle wheel between the driven and idler rollers for cutting the vehicle wheels to a rotund shape. The cutting arbor is driven by a shaft 51 supported by a pedestal 52 above a supporting frame 18.

From the foregoing the operation of the device should be apparent. The vehicle wheels to be trued are each supported by a pair of cradles. Each cradle has a driven roller which rotates the vehicle wheel as the cutting arbor forms it to the true shape. In order to hold the vehicle wheel in position, a cable is passed over the bearing of the axle wheels, and is tightened by an hydraulic piston and cylinder. The hydraulic piston and cylinder operate to firmly hold the vehicle wheels against the idler and driven rollers during the cutting operation.

In the drawing and specification, there has been set forth a preferred embodiment of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

I claim:

1. In a device for truing wheels mounted on opposite ends of a vehicle axle, a cradle for rotatably supporting the wheels including a driven roller and an idler roller, drive means for said driven roller to rotate said wheels, an abrading tool for truing said wheels to a rotund shape, a flexible hold-down member passing over the vehicle axle and anchored at one end to said cradle for maintaining said wheels in said cradle, and power means for applying force to said hold-down member.

2. In a device for truing wheels mounted on opposite ends of a vehicle axle, a cradle below said wheels having a driven roller and an idler roller, an abrading tool for truing said wheels to a rotund shape, a flexible hold-down member anchored at one end to said cradle and passing over the vehicle axle, power means for applying force to said wheels against said cradle.

3. In a device for truing wheels mounted on opposite ends of a vehicle axle, a cradle below said wheels having a driven roller and an idler roller, a tool for truing said wheels to a rotund shape disposed between said driven and idler rollers, a flexible hold-down member anchored at one end to said cradle and passing over the vehicle axle, and means including an hydraulic piston and cylinder for applying force to said hold-down member.

4. In a device for truing wheels mounted on opposite ends of a vehicle axle, a cradle for supporting the wheels including a driven roller and an idler roller, drive means for said driven roller, an abrading tool for truing said wheels to a rotund shape disposed between said driven and idler rollers, drive means for said abrading tool, a flexible hold-down member anchored at one end to said cradle and passing over said vehicle axle, and means including an hydraulic piston and cylinder for applying force to said hold-down member.

5. In a device for truing wheels mounted on opposite ends of a vehicle axle, a cradle below said wheels having a driven roller and an idler roller, a tool for truing said wheels to a rotund shape, a flexible hold-down member anchored at one end to said cradle and passing over the vehicle axle for maintaining said wheels in contact with said driven and idler rollers, power means for applying force to said hold-down member, and means for adjusting said idler roller to maintain wheels of varying diameter in proper relation to said tool.

References Cited in the file of this patent

UNITED STATES PATENTS

| | | |
|---|---|---|
| 596,336 | Norton | Dec. 28, 1897 |
| 2,351,881 | Schottland | June 20, 1944 |
| 2,622,374 | Stanley | Dec. 23, 1952 |
| 2,677,307 | Bloss | May 4, 1954 |